United States Patent [19]

Dedolph

[11] Patent Number: 4,517,764

[45] Date of Patent: May 21, 1985

[54] CHAIN OF SOIL PLUGS AND A PROCESS FOR PRODUCING A CHAIN OF SOIL PLUGS

[75] Inventor: Richard R. Dedolph, Naperville, Ill.

[73] Assignee: Gravi-Mechanics, Naperville, Ill.

[21] Appl. No.: 351,232

[22] Filed: Feb. 22, 1982

[51] Int. Cl.³ .................... B29D 27/04; A01G 9/10
[52] U.S. Cl. .......................................... 47/77; 47/74;
          47/DIG. 7; 264/45.3; 264/46.3; 264/46.6;
          264/46.9
[58] Field of Search ............... 264/45.3, 46.3, 46.6;
          47/77, 87, 84, 74, DIG. 7

[56] References Cited

U.S. PATENT DOCUMENTS

| | | | |
|---|---|---|---|
| 2,271,058 | 1/1942 | Binns | 264/46.3 X |
| 3,034,942 | 5/1962 | Heiks | 264/46.3 X |
| 3,172,234 | 3/1965 | Eavis | . |
| 3,722,137 | 3/1973 | Kesinger et al. | 47/87 |
| 3,739,522 | 6/1973 | Greenbaum | 47/87 |
| 3,906,875 | 9/1975 | Kesinger et al. | 47/87 X |
| 4,034,508 | 7/1977 | Dedolph | 47/84 |
| 4,213,273 | 7/1980 | Dedolph | 47/74 |
| 4,221,749 | 9/1980 | Dedolph | 264/45.3 |
| 4,241,537 | 12/1980 | Wood | 47/77 |
| 4,278,625 | 7/1981 | Dedolph | 264/45.3 X |
| 4,369,599 | 1/1983 | Franclet et al. | 47/77 X |
| 4,422,990 | 12/1983 | Armstrong et al. | 264/45.3 |

FOREIGN PATENT DOCUMENTS 922106  3/1973  Canada .

OTHER PUBLICATIONS

American Society of Agricultural Engineers–Paper No. 79–1613, Automatic Bandoleer Feeder for Transplanters–Moden & Brewer.
American Society of Agricultural Engineers–Paper No. 78–1011, Automatic Transplanter System for Field Crops–Brewer.

Primary Examiner—Philip Anderson
Attorney, Agent, or Firm—Wood, Dalton, Phillips, Mason & Rowe

[57] ABSTRACT

A continuous molding machine (10) for forming two chains (55) of soil plugs (50) for use in germinating seeds or otherwise growing plants. A continuous sheet of paper (22) is corrugated to conform to a series of mold elements (14) and a reaction mixture (32) of polymerizing agent and soil slurry is added over the paper to conform to the mold element shape. Another sheet of paper (38) is added over the top of the mixture (32) and the entire assembly is then passed under a series of pressure belts (42, 44, 46) during which time the mixture (32) is cured. The chain of soil plugs (50) which emerges from the pressure belts (42, 44, 46) is encased on both sides by paper (22, 38) and may be cut to provide a pair of separate soil plug chains (55).

9 Claims, 16 Drawing Figures

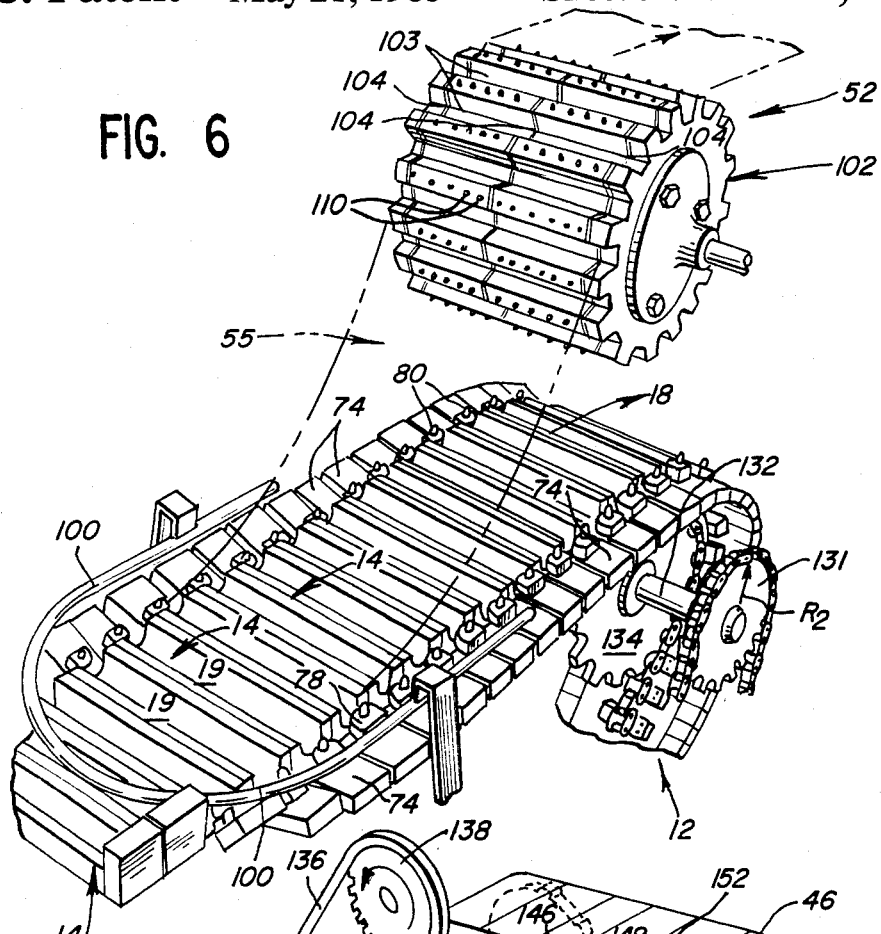
FIG. 6
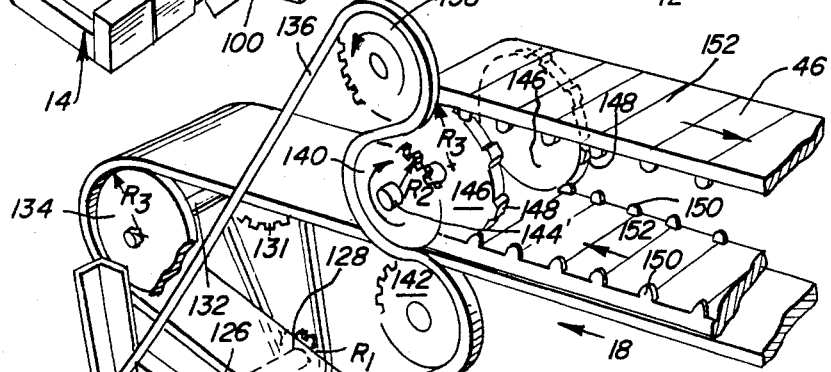
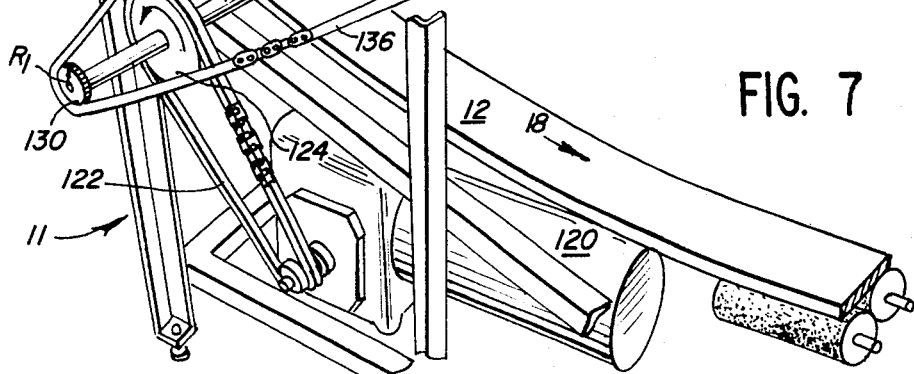
FIG. 7

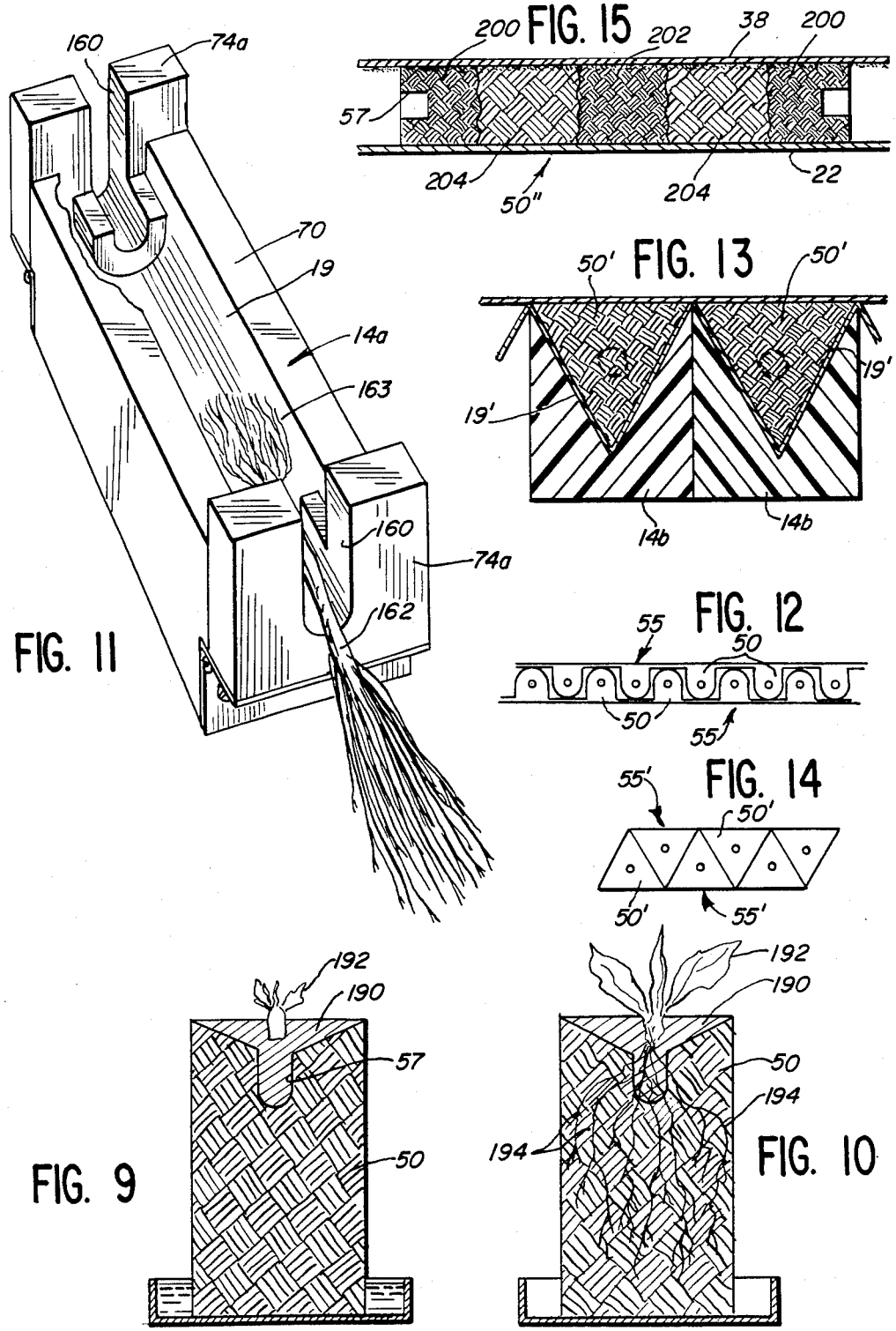

CHAIN OF SOIL PLUGS AND A PROCESS FOR PRODUCING A CHAIN OF SOIL PLUGS

TECHNICAL FIELD

This invention relates generally to an interconnected chain of rooting medium modules or plugs useful in the propagation of plants either sexually or asexually and more particularly to a molding system which can continuously and automatically produce independent or interconnected rooting medium modules or plugs of virtually any diameter to length configuration.

BACKGROUND ART

The benefits of using elastomeric hydrophylic open-celled stabilized soil modules or plugs for a rooting medium are well-documented by commercial application in the production of transplants, rooting of cuttings, and as an adjunct step in transplanting of field-grown seedlings. Approaches to these applications are many and varied. For example, lettuce transplants which are greenhouse grown for 12 to 15 days after seeding in plugs (1.25 cm in diameter and 4.5 cm in length) will, upon field transplanting, usually greatly outyield either direct seeded lettuce or lettuce grown from transplants which are greenhouse grown for 25 to 35 days in a nonstabilized medium. Further, plug transplanted lettuce fields are more uniform in maturity, requiring a fewer number of successive harvests to obtain the maximum yield.

Celery transplants which are initially greenhouse grown in stabilized soil plugs for 25 to 40 days will at harvest often yield more than corresponding celery transplants which are grown for 50 to 75 days in non-stabilized medium. Like lettuce, these higher yields are attributable to not only the stabilized medium per se but also to the fact that it permits the use of younger transplants. Fields grown from these younger plug-grown celery transplants tend to form plates at a more uniform depth than other transplants. With use of automatic cutting and harvesting of the crop, both undue retrimming before shipping due to too deep cutting or undue loss from shattering due to too shallow cutting are minimized.

The transplanting of physiologically younger and morphologically less developed plants does not result in a correspondingly longer time in the field between transplanting and harvesting since transplanting shock is virtually absent in properly handled plug-grown transplants. Generally, plug-grown lettuce transplants will be ready for first harvest zero to three days later than corresponding lettuce transplants grown in nonstabilized medium which are 10 to 20 days older at the time of transplanting. Plug-grown celery transplants, usually about a month younger at the time of transplanting, will be ready for harvest zero to 10 days later than corresponding older transplants grown in nonstabilized medium.

The absence of transplanting shock with young seedlings grown in stabilized soil plus is the consequence of a number of factors. The root system is less fully differentiated so that more roots are hair roots and water absorbing. The roots are substantially preserved and protected by the medium during transplanting. Aerial portions of the plant are not as extensively developed and thus do not put a great water demand upon the root and stabilized soil system.

The provision of a soil plug enabling transplanting of younger plants has yet another advantage. This advantage derives from the fact that during the short growth period under controlled environment, these juvenile plants are not as greatly morphologically modified by sophisticated greenhouse environments, are physiologically "harder" plants and are thus more easily transplanted. This advantageous difference is evinced in one example by the fact that these juvenile plug-grown transplants set in the field at a 45° angle will straighten and grow upright without either deleterious or noticeable deformation of the mature plant.

A desirable medium which has been used for stabilized soil plugs is formed by mixing a urethane prepolymer with a slurry composed of lime amended peat and water and permitting it to foam. However, forming the soil plugs of this material has presented an ongoing problem.

Large soil masses may be formed by the urethane foaming reaction and the soil modules desired may be cut from the soil mass. However, despite the relatively short pot life of the prepolymers employed (30 to 300 seconds as used), large sized soil masses will have visibly differing densities and structure from the top to the bottom of the soil mass. This condition results in demonstrably different physical characteristics of plugs or modules, depending upon where they are cut from the soil mass. Also, some waste from trimming occurs with such a molding system. Another alternative for forming the soil plugs is to place the freshly mixed slurry and prepolymer directly into a mold of the desired size and shape and permit it to foam in place. However, the material as mixed is quite viscous and does not flow well. Thus the filling of small bore long cavities is very difficult both due to problems of flowing and air entrapment. Further, if such cavities are filled in a vertical position, a density gradient is formed along the cavity yielding a plug of different physical structure and density from top to bottom.

Another molding method is "pan forming." This method consists of filling a pan with prepolymer slurry mix and then placing a multiple cavity mold into the pan, forcing the prepolymer slurry mix to flow upward into the mold cavities while foaming. Though this method may effectively solve the air entrapment problem during mold filling, it is wasteful. Overfilling of the pan is necessary to ensure that all cavities of the mold are completely filled because of both uneven distribution in the pan and lack of precise control of the foaming reaction. Thus though waste in a pan-molding system can be minimized, it cannot be eliminated.

Specifically the soil plugs obtained from the foaming reaction when properly manipulated are a body of elastomeric open-celled hydrophylic rooting medium with a quantity of soil particles being held as an integral part of the foam matrix. The plugs are used both to germinate the seed and also to transplant the resulting seedling while it is still quite small. Due to the special physical characteristic of the soil plug, there occurs an integral penetration of the roots within the medium. The seedling must be transplanted without removing it from the soil plug because roots and medium behave as a single system. The encasement of these tender roots within the elastomeric medium eliminates damage to the roots which would occur if the seedling were either removed from the soil plug or transplanted by other means. Damage to the aerial portions of the seedling during transplanting is similarly avoided inasmuch as the soil plug itself is handled rather than the seedling top.

In order to efficiently handle soil plugs, it has been desirable to form such seed plugs in an interconnected array. Heretofore, the soil plugs in chains or belts have been formed by extending a continuous strip of porous material through the plugs, the plugs being molded and cured around that material. The extension of that material through the soil plugs has however tended to reduce the strength of the soil plug since the plug is in effect longitudinally bisected by the connecting material. As a result, soil plugs so made have been more susceptible to breaking apart. These plugs have also had the disadvantage of not being interconnected over their full length since the end of the plug in which a seed cavity was formed could not accommodate the internally disbursed attachment member. Inadvertent twisting of the chain of plugs has thus occurred. Further, the centrally deployed interconnecting member has rendered the plugs somewhat inapplicable to some root crop production by, in some cases, restricting extensive root growth to but one side or the other of the interconnecting member. A long central root is desirable in plants, such as sugar beets, in which the root constitutes a storage organ and the desired plant part. Branching of the central root ("sprangling") results in a yield loss. Further, roots in long thin plugs may be transplanted more deeply in the field, thereby aiding in survival of the plant since roots emerging from the bottom of long plugs are in contact with soil moisture not readily lost to surface drying.

Some cultural practice constraints have arisen due to the use of prior art soil plugs. When prior art plugs were transplanted into dry surface soils, they have had water withdrawn from them. This condition has imposed the requirement of irrigation immediately upon transplanting and subsequent maintenance of adequate surface soil moisture to prevent drought damage until the transplants are deeply enough rooted so that surface drying will not desiccate plug and plant alike. Further, if the plugs were not planted deeply enough, the top of the soil plug sometimes acted as a wick, removing water from around plant roots and from the surrounding soil by evaporation from the upper portion of the exposed plug.

The present invention is directed toward overcoming the cultural and mechanical problems set forth above.

DISCLOSURE OF THE INVENTION

In one aspect of the present invention, there is the use of a continuous molding machine for producing a plurality of interconnected soil plugs in which plants may be grown prior to permanent planting. The molding machine includes a continuous chain having a plurality of open top mold elements, a drive mechanism for the chain, and means for conforming a continuous cover material to a surface of the mold elements. A mechanism is provided for introducing a reaction mixture of polymerizing agent and soil slurry to the mold elements and for distributing this mixture in the mold cavities. Pressure belts are provided to define a top to the mold during the curing of the mixture, the top of the mold elements being a side of the cured soil plugs.

An object of the present invention is the provision of a process using a continuous molding machine which does not require precise synchronous motion between two mold elements.

Another object of the present invention is to form a chain of soil plugs stabilized through a polymerized matrix, each including a body of elastomeric open-celled hydrophylic polymer with a quantity of particles of soil mix forming an integral part of this spongy foamed matrix. A plant of transplant size may be established in each soil plug so as to incorporate the roots of the plant therein, the entire soil plug with plant being transplanted, thereby eliminating the need to grasp the plant top during transplanting and accordingly preventing any damage to the plant which would occur from such handling and enabling the planting of younger more adaptable plants.

Another object of the present invention is to provide an interconnected array of polymerized soil plugs to accommodate ready handling thereof.

Still another object of the present invention is the efficient production of chains of polymerized soil plugs, the present invention being capable of producing two such chains at once and with virtually no wasted material.

In one aspect of the present invention, the soil plugs are formed with a seed recess in either end and are halved transversely (longitudinally of the chain) and a seed is sown into the seed recess in each of the two resultant soil plugs. An object of this invention is to permit the seeds to germinate under optimal environmental conditions in a greenhouse or the like and to thereafter transplant those seedlings which have properly grown from the seeds. This system eliminates the high rate of failure which often accompanies the attempted germination of seeds in the fields and eliminates the need for thinning and blocking. Alternatively, when working with tissue cultures, a Phase III agar-based medium, may be gelled in each seed recess and an explant placed on the medium. This provides desirable growing conditions for initial root development in the gelled medium and subsequent more normal root development in the soil-like portion of the plug.

In another aspect of the present invention, a continuous chain of soil plugs is produced in which the plugs are interconnected by a strip of material attached around the plugs. The plugs are molded horizontally with the soil plug material at a minimum depth during forming. Soil plugs produced in this manner have greater structural strength deriving from the encasing material and are less susceptible to breaking and are more rigid during handling. Further, the soil plugs foster the growth of tap roots with the attendant yield and transplanting advantages and stratification of materials within the plug is minimized by distance and occurs laterally rather than vertically.

In still another aspect of the invention, the soil plugs may be automatically molded around cuttings. After rooting, the rooted cutting in the soil plug may be handled as any other plug-grown transplant and enjoys all of the already named benefits of this mode of production.

In yet another aspect of this invention, field-grown tree seedlings may be encased in this rooting medium and thence held therein until they are reestablished and then transplanted to the orchard or forest. Under this production regime, all of the benefits of field growing of tree seedlings may be realized without the attendant high mortality and marked setbacks associated with bare-rooted transplants. Of great importance in reforestation of conifers, this cultural regime will virtually eliminate "J" rooting since the encased soil plug offers substantial protection from turning the root apex upward during transplanting. "J" rooting in conifers may alone result in a 40 percent loss in harvestable timber after 25 years of growth. This advantage alone would justify adoption of this two-step cultural regime as contrasted to the direct transplanting of field-grown seedlings.

BRIEF DESCRIPTION OF THE DRAWINGS

FIG. 6 is a perspective view of the end of the continuous molding machine;

FIG. 7 is a perspective view of the drive mechanism of the continuous molding machine;

FIGS. 9 and 10 are cross-sectional views of soil plugs as used with tissue cultures;

FIG. 11 is a perspective view of a modified mold element for use in an alternative embodiment of the present invention;

FIG. 12 is a plan view of a pair of soil plug chains mated together;

FIG. 13 is a cross-sectional view of a modified mold chain during molding;

FIG. 14 is a plan view of a pair of mated soil plug chains of the type shown in FIG. 13;

FIG. 15 is a longitudinal cross-sectional view of a modified soil plug; and

BEST MODE FOR CARRYING OUT THE INVENTION

Figure 1:
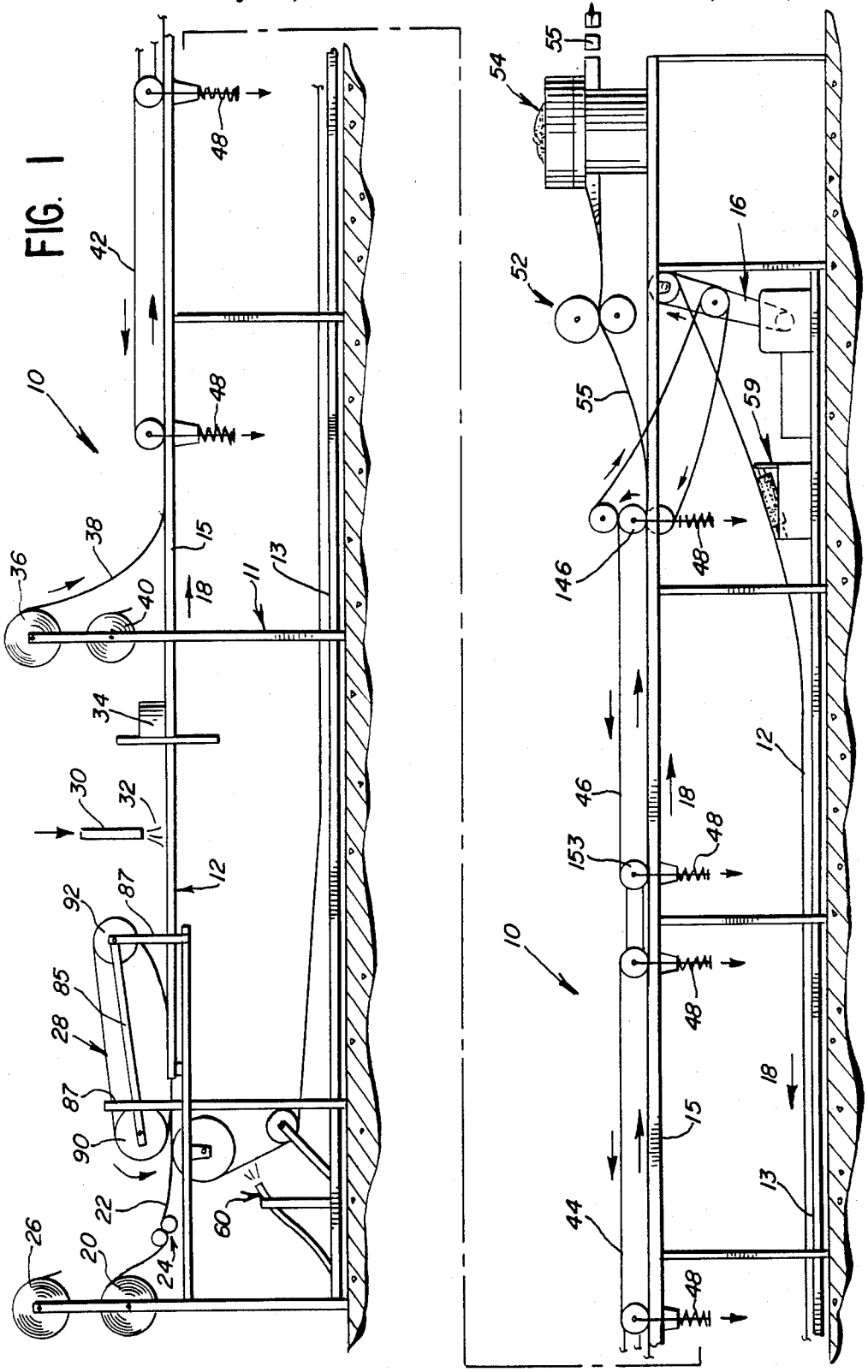
FIG. 1 is a simplified schematic side view of the presently preferred embodiment of the molding machine.

FIG. 1 shows a general schematic of the overall configuration of the continuous molding machine 10 and will first be described in broad context. Various portions of the machine 10 will be described in greater detail hereinafter with respect to the additional figures of the drawing.

A frame 11 is supported on a floor and has two vertically spaced decks 13, 15. An endless mold chain 12 extends substantially the length of the machine 10 and passes in opposite directions over the respective decks 13, 15. The mold chain 12 includes a link chain 17 and mold elements 14 which are shown in detail in FIGS. 2-6 and will be described with respect to those figures hereinafter. The mold chain 12 is driven by suitable drive mechanism 16 (described in greater detail with respect to FIG. 7) so that the chain moves in the direction of the arrow 18 with the top pass of the mold chain 12 moving left to right in FIG. 1.

A roll of paper or film 20 is mounted on the frame 11 about an axis perpendicular to the long axis of the mold chain 12 so that a continuous sheet of paper or film 22 is fed onto the mold elements 14 of the mold chain 12. A suitable pair of rollers 24 is provided between the upper roll 20 and the mold chain 12 to maintain a relatively constant back tension on the paper sheet 22 as it is fed from a roll 20 onto the mold chain 12. A standby roll of paper 26 may also be mounted on the frame 11 to substantially reduce changeover time when the one roll of paper 20 runs out.

A suitable device (not shown) may also be provided to incorporate slow-release fungicides, bacteriacides, insecticides, nematocides, fertilizers, and/or growth regulators into or upon the upper (inner) surface of the paper 22. Such materials can be used to form a zone of protected edaphic environment around the soil plugs for early growth. Also, this same encasement may be used as a protective shield against certain field applied herbicides.

A paper corrugating apparatus 28 is disposed on the frame 11 above the mold chain 12 close to the beginning of the top pass of the mold chain 12 and is driven in coordination with the mold chain 12 through a portion of the path of travel of the mold chain 12. The paper corrugating apparatus 28 forces the paper or film sheet 22 into the transverse grooves or cavities 19 (FIGS. 2 and 3) in the mold elements 14 so that the paper takes a corrugated shape, forming a substantial segment of the mold surface as will be discussed more fully with regard to FIG. 3.

With the paper or film sheet 22 conformed to the cavities of the mold elements 14, the mold chain 12 moves under a nozzle 30 which added a reaction mixture 32 of soil slurry and polymerizing agent (i.e. prepolymer) to the surface of the sheet 22 and fills the cavities 19 in the mold elements 14. The mold chain 12 passes underneath a scraper 34 which scrapes the excess mixture 32 from the top of the mold elements 14 and into any unfilled portions of the cavities 19. Another roll of paper 36 is mounted downstream of the scraper 34 to feed a second continuous sheet of paper or film 38 over the flat top surface of the mixture 32 within the cavities of the mold elements 14. Again, an additional roll of paper 40 may be provided to substantially reduce changeover time when the one roll of paper or film 36 runs out. Also, slow-release fungicides, etc. may be applied to the bottom (inside) of the second sheet of paper 38 for a purpose described heretofore.

Thereafter, the chain of uncured soil plugs wrapped on the top and bottom by the two continuous sheets of paper or film 38, 22, respectively, are cured while passing beneath a series of pressure belts 42, 44, 46. The pressure belts 42, 44, 46 are biased down against the mold chain 12 by springs 48 in a manner more fully described hereafter to maintain a relatively constant pressure on the molded mixture 32 as it is cured (of course, the mixture 32 becomes a product as it reacts, and the product cross links as it cures, but for ease of reference, "mixture" as used herein refers to the material both during and after reaction).

The pressure belts 42, 44, 46 are driven together with the mold chain 12 (in a manner to be hereinafter described with respect to FIG. 7) so that slipping between the various pressure belts 42, 44, 46 and the engaged flat paper sheet 38 is minimized. However, since the pressure belts, 42, 44, 46 are flat and all molding is essentially done by the mold chain 12, a certain amount of slippage can be tolerated. This eliminates a problem presented in the prior art where the interconnecting member (non-woven cloth) extends through the center of the plugs—it was virtually impossible to maintain two half-mold chains in the required synchronization over an extended period of operation due to uneven wear or stretch in two chains carrying "matched" mold components.

The rate of speed of the mold chain 12 and pressure belts 42, 44, 46 is variable and may be adjusted depending upon the curing time of the mixture and the rate of deposition of mixture 32 in the mold elements 14, the speed being such that the material is cured when it reaches the end of the last pressure belt 46. Control of the rate of speed of the mold chain 12 may be done manually or automatically. Since the mixture 32 foams, expands and "sets" as it cures, a rolling pressure transducer (not shown) may be provided at the end of the last pressure belt 46, which transducer would roll over the soil plug chain 55 to detect the amount of swelling of the mixture 32 in the mold elements 14. If the mold chain 12 is moving too fast (and thus not providing enough curing time and underfilling cavities), the transducer would roll into depressions in the mold elements 14 and thus signal the chain 12 to slow down slightly. Alternatively, if the chain 12 is moving too slowly, the transducer would note the excessive swelling in the mold elements (by sensing bumps at each mold element 14) and thus signal the chain 12 to speed up slightly. Such automated control primarily functions in continuous fine tuning of production. The coarse tuning is accomplished by visually adjusting mixture 32 resin mix deposition rate and molding chain speed so that there is no substantial build-up of resin mixture 32 mix behind the scraper 34.

The resultant soil plug when cured may be a polyurethane resin foam forming a continuous phase throughout the soil plug, the foam being elastomeric, open-celled and hydrophilic in character. The soil particles form a more or less integral portion of the polyurethane foam matrix. Suitable reaction mixtures and methods of making them are disclosed in my U.S. Pat. No. 4,034,548, my related U.S. Pat. Nos. 4,213,273; 4,215,513 and 4,278,625 and also in my U.S. Pat. No. 4,329,436, the disclosures of these being hereby incorporated by reference.

The soil plugs 50 may also be molded if desired of polyurethane foam only without soil particles. Also, the soil plugs 50 may be formed under asepsis (i.e., without bacteria contamination) when it is desired to use the plug 50 with a tissue culture as a Phase III rooting media (as is further discussed with respect to FIGS. 9 and 10).

Referring again specifically to FIG. 1, as the mold chain 12 emerges from the last pressure belt 46, the cured chain 55 of soil plugs 50 is separated from the mold chain 12. The soil plug chain 55 then passes through a cutter 52 for cutting the paper sheets and each plug 50 in half whereupon each half sheet and half plug are turned on end so that a seeder 54 (FIGS. 8 and 16) can add a seed to a depression 57 (see FIGS. 4 and 5) in the end of each plug. As a result, two finished chains 55 of soil plugs 50 emerge which may then be placed in an appropriate environment to allow the seeds to germinate and grow before planting in the field. The paper 22, 38 between adjacent plugs 50 may be cut to separate the chain 55 into discrete increments, i.e., ½ dozen or a dozen plugs 50, which may be packaged and sold separately.

A cleaning station 59 is located near the end of the track for cleaning the mold chain 12 after the soil plug chain 55 has been released. Also, spray nozzles 60 are provided near the beginning of the top pass of the mold chain 12 for spraying a release agent onto the elements 14. The release agent prevents the slurry resin mixture 32 from sticking to the portions of the mold elements 14 in contact with it during curing.

Figure 2:
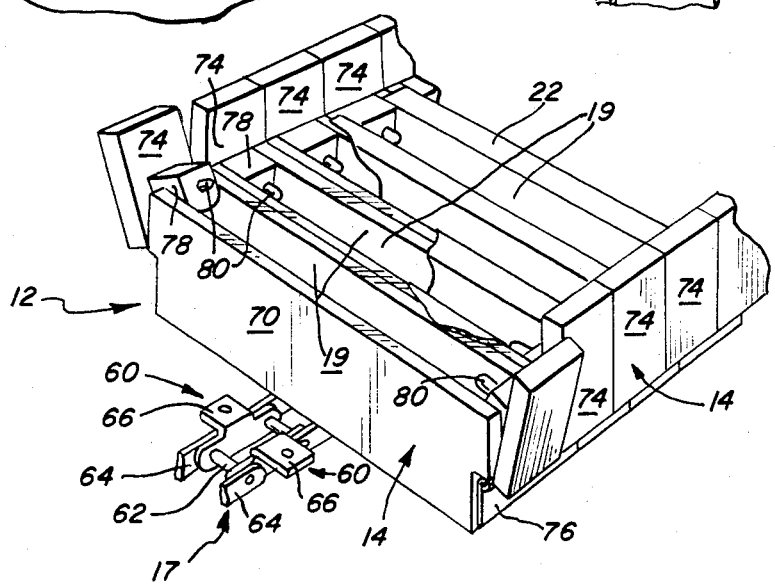
FIG. 2 is a partial perspective view of the mold chain with a mold element omitted to show the chain.

Going now to the details of the apparatus, a portion of the mold chain 12 is shown in more detail in FIG. 2. The mold chain 12 is comprised of the continuous link chain 17 and a plurality of side by side mold elements 14. The link chain 17 has a series of brackets 60 interconnected by pins 62 and links 64 so that the link chain 17 is flexible in a plane transverse to the axis of the pins 62 and containing the longitudinal axis of the mold chain 12. Each bracket 60 has a pair of flanges 66 to which one mold element 14 may be mounted by suitable means such as screws. The mold elements 14 are mounted to the outside of the link chain 17 and are separate from one another to allow the chain to be deflected. Preferably, the mold elements 14 abut one another when the chain 12 is straight.

The individual mold elements 14 consist of a body portion 70 through which the transverse groove or cavity 19 extends, the groove or cavity 19 being open on each end. A die element 74 is pivotably secured to each end of the body portion 70 in a suitable manner such as by a hinge 76. Each die element 74 has a die portion 78 receivable within, and conforming to, the end of the groove or cavity 19 when the die element 74 is pivoted inward in a molding position. The die portion 78 also includes a nipple portion 80 which is essentially aligned with the axis of the groove or cavity 19 when in the molding position. The nipple portion 80 forms a seed depression 57 (see FIGS. 4 and 5) within the mixture 32 during molding.

Figure 3:
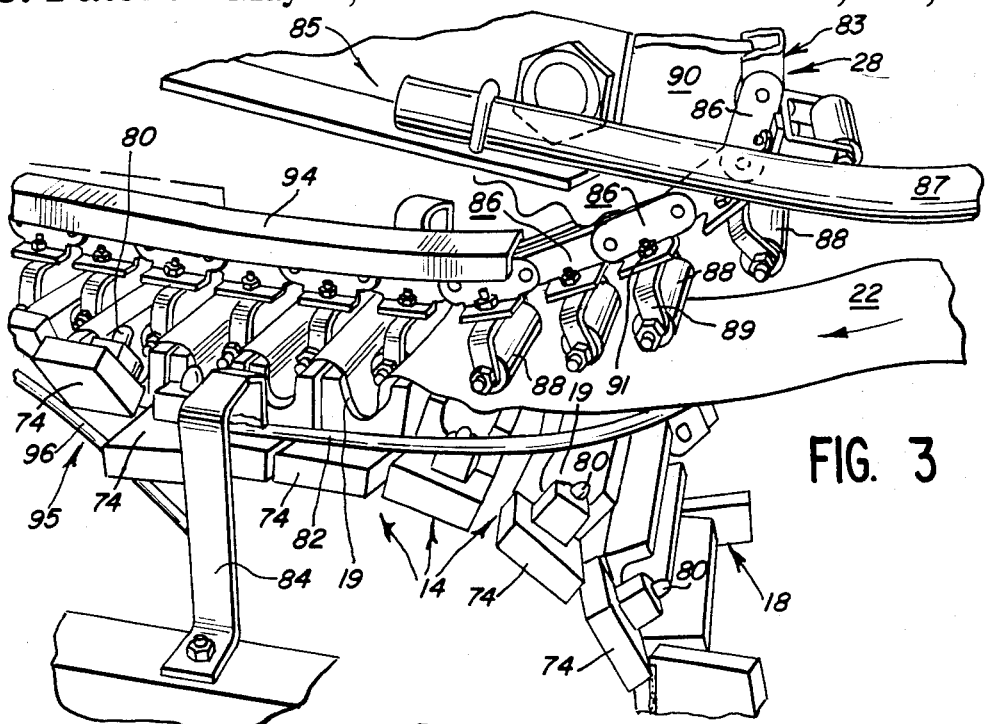
FIG. 3 is a perspective view of a portion of the continuous molding machine showing the corrugating of the paper within the mold elements.

The feeding of the sheet of paper 22 to the corrugating apparatus 28 is illustrated in FIG. 3. The mold chain 12 with mold elements 14 is driven in the direction of the arrow 18. A camming bar 82 is supported by suitable means such as a bracket 84 and acts as a cam surface to ensure that, as the mold elements 14 enter the paper feed area, the die elements 74 are pivoted outward relative to body portion 70 so that the die portions 78 clear the grooves or cavities 19.

Supported on brackets 85 and supports 87 (see also FIG. 1) above the mold chain 12 is the paper corrugating apparatus 28. The paper corrugating apparatus 28 consists of a link chain 83, similar to link chain 19 of mold chain 12, with a series of interconnected links 86, each of the links 86 having forming members or corrugating rollers 88 secured thereto by bifurcated brackets 89 and bolts 91. The paper corrugating apparatus 28 turns freely about sprocket gears 90, 92 (FIGS. 3 and 1) at either end of the supports 87 and is maintained in the proper position above the mold chain 12 by a guide track 94 (FIG. 3) which runs parallel to the longitudinal axis of the mold chain 12.

The corrugating rollers 88 are spaced apart the same distance as the grooves or cavities 19 in the mold elements 14 so that, as each roller 88 is received within an aligned groove or cavity 19, the paper corrugating apparatus 28 and mold chain 12 will be moved together. Accordingly, as the paper sheet 22 is fed into the nip between the rollers 88 and cavities 19, the rollers 88 push the paper 22 down into the cavities 19 of the mold elements 14 as can clearly be seen in FIG. 3.

Once the paper 22 is positioned within the cavities 19 of the mold elements 14, the die elements 74 are pivoted into registry with the open ends of the grooves or cavities 19 so that the die portions 78 hold the edge portions of the paper 22 in the grooves 19. That is, a second cam element 95 having a cam surface 96 is provided on the brackets 84 on either side of the mold chain 12 to pivot the die elements 74 about their hinges 76, forcing the die portion 78 over the paper 22 and thereby trapping the peripheral edges of the paper 22 in the cavity 19. The mold elements 14 on the mold chain 12 at that point are oriented as at the right portion of FIG. 2 with the continuous sheet of corrugated paper 22 covering or lining the groove or cavity 19 in each mold element 14. Beyond where the second cam surface 96 pivots the die elements 74 inward, the path of the link chain 83 of the paper corrugating apparatus 28 moves up and away from the mold chain 12 (see FIG. 1), withdrawing the rollers 88 from the grooves or cavities 19. It is preferred that the rollers 88 be free turning to avoid any tearing or damaging of the paper 22 as the rollers 88 are withdrawn.

As explained previously with respect to FIG. 1, once the paper 22 is corrugated into the cavities 19 in the mold chain 12, mixture 32 is fed onto the surface of the paper 22 and into the cavities or grooves 19. The mixture 32 conforms to the corrugated shape of the paper 22 in the cavities or grooves 19 and passes beneath the scraper 34 which levels out the top of the mixture substantially flush with the top edge of the body portions 70 of the mold elements 14. Another continuous strip of paper 38 is then added over the top of the mixture.

Thereafter, the paper covered, mixture filled cavities 19 pass beneath a series of pressure belts 42, 44, 46. The pressure belts 42, 44, 46 extend through the curing portion of the path of the mold chain 12 and are driven together with the mold chain 12 and the engaged paper sheet 38 which covers the curing mixture 32. By confining the paper covered, mixture filled cavities 19 between the mold chain 12 and the pressure belts 42, 44, 46, the slurry 32 is conformed to the shape of the mold and die elements 14, 74 and adhesion of the paper 22, 38 to the mixture 32 is ensured. The cured mixture 32 not only solidifies itself into a soil plug 50 but also bonds the paper sheets 22, 38 to the soil plug 50 as well. The mixture 32 upon curing and setting up thus forms soil plugs 50 which are interconnected in a soil plug chain 55.

As should be apparent, a certain amount of mixture 32 will be present in the soil plug chain 55 between the paper sheets 22, 38 even in the spacing between the soil plugs 50. The mixture 32 aids in maintaining the structural integrity of the chain 55 by bonding the paper sheets 22, 38. Further, this structure causes each soil plug 50 to have a pair of longitudinal slits where the paper 22, 38 is joined together, permitting horizontal secondary roots to grow from those slits during the growth and rooting of the transplants.

Since the paper or film 22, 38 has substantially greater tensile strength than the cured mixture 32, soil plugs 50 of small cross-sectional area are created with a greater resistance to flexing along the longitudinal axis than is obtainable from unencased prior art soil plugs. Further, by using paper or film 22, 38 which is virtually water impermeable, the plugs 50 will be protected when transplanted. Accordingly, substantial loss of water from the soil plug 50 to dry surface soils is virtually eliminated. Also, if the soil plugs 50 are inadvertently transplanted at too shallow of a depth with the top of the plug 50 projecting from the ground, the paper 22, 38 will protect the sides of the plugs 50 to virtually eliminate wind drying of the plant and rooting medium and thus avoid field losses which could occur due to such drying.

Figure 4:
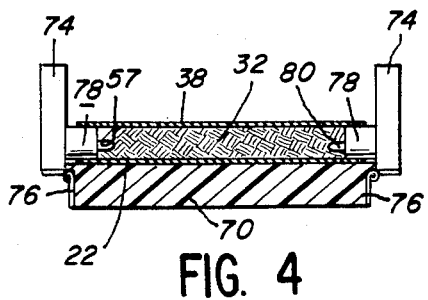
FIG. 4 is a cross-sectional view of a soil plug within the mold element.
Figure 5:
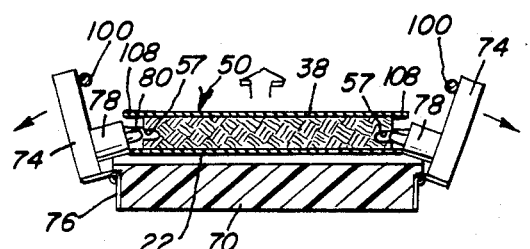
FIG. 5 is a cross-sectional view of a soil plug as it is being removed from the mold element.

FIGS. 4–6 show the terminal end of the path of the mold chain 12 where the cured chain 55 of soil plugs 50 emerges from the last pressure belt 46. A U-shaped cam bar 100 having its curved portion facing upstream into the oncoming mold elements 14 is supported above the mold chain 12 and acts to force the upstanding portions of the die elements 74 outwardly away from the cured soil plugs 50.

A cross-sectional view of a cured soil plug 50 as it emerges from the last pressure belt 46 is shown in FIG. 4. When the cam bar 100 forces the die elements 74 outwardly as shown in FIG. 5, the nipple portions 80 tip up as they pull out and away from the depressions 57 in the soil plug 50 and, as a result, they lift the soil plug 50 slightly from the mold element 14.

As shown in FIG. 6, the cured chain 55 of soil plugs 50 then passes over the drive wheel 102 of the cutter 52. The drive wheel 102 has appropriate grooves 103 lying parallel to the axis of rotation of the wheel 102 and disposed in the peripheral surface of the wheel 102 to form a sprocket arrangement. The grooves 103 are spaced apart in a peripheral direction equal to the spacing of the plugs 50 in the chain 55.

The configuration of the soil plug chain 55 is advantageous in that it may be moved, turned, twisted and indexed through appropriate flat guides with the motion being imparted by a sprocket such as the drive wheel 102 using the soil plugs 50 as the "teeth". This is advantageous both during formation of the soil plug chain 55 and also during subsequent handling. This also facilitates further handling of the soil plug chain 55, as for example when it is desirable to index the chain with optical sensing systems as are known for detecting small plants or dead plants prior to transplanting.

The drive wheel 102 also has three radially disposed grooves 104, transverse to the axis of rotation of the wheel 102 into which the cutting blades 106 (see FIG. 16) fit to trim off the excess paper 108 (see FIG. 5) on the sides of the soil plug chain 55 and also to cut the chain 55 of plugs 50 in half. The drive wheel 102 may also include projections 110 between each groove 103 for perforating the paper sheets 22, 38 between the soil plugs 50 to ease the separation of soil plugs 50 when desired.

One preferred form of drive mechanism 16 is shown in FIG. 7 and has a variable speed motor 120 driving a chain 122 which drives a sprocket 124 fixed to a drive shaft 126 carried by the machine frame 11. Fixed to the drive shaft 126 are two drive sprockets 128, 130, each having a radius of $R_1$.

One drive sprocket 128 drives a sprocket gear 131 (best seen in FIG. 6) having a radius of $R_2$ which is fixed to the mold chain drive shaft 132 rotatably mounted adjacent to the terminal end of the mold chain 12. The mold chain drive shaft 132 has a sprocket gear 134 (with a radius $R_3$) which engages the pins 62 of the mold chain 12 to drive the mold chain 12 in the direction of the arrows 18. The other drive sprocket 130 drives a chain 136 which is in serpentine arrangement around three sprocket gears 138, 140, 142, the middle sprocket gear 140 having a radius of $R_2$ and being fixed to a belt drive shaft 144. The belt drive shaft 144 is fixed to a drive wheel 146 having a radius $R_3$ and having teeth 148 engaging projections 150 on the inside of the pressure belt 46 to drive the pressure belt 46 in the direction of the arrow 152. It is apparent that this gearing with the described radii $R_1$, $R_2$, $R_3$ causes the mold chain 12 and the pressure belt 46 to move at the same rate together with the curing chain 55 of soil plugs 50 therebetween.

The belt drive shaft 144 and the shaft (not shown) of the idler wheel 153 (FIG. 1) at the opposite end of the pressure belt 46 are fixed to a suitable frame (not shown) which is itself biased downwardly with respect to the machine frame 11 by the springs 48 (FIG. 1). This causes the pressure belt 46 to exert a relatively constant pressure on the paper covered, mixture filled cavities 19. A guide (not shown) similar to the guide track 94 of the paper corrugating apparatus 28 may also be fixed to the frame of the pressure belt 46 to exert the pressure over the entire length of the belt 46.

The other pressure belts 42, 44 should be mounted in substantially the same way as described for pressure belt 46 above. Although not shown in FIG. 7 to prevent cluttering of the drawing, these pressure belts 42, 44 may also be driven at the same rate as the mold chain 12 by the belt drive shaft 144. As will be obvious to one skilled in the art, a chain may be looped over a drive sprocket (not shown) on the belt drive shaft 144 and an identically sized driven sprocket fixed to the drive wheel (having a radius of $R_3$) of the adjacent pressure belt 44 to drive that belt 44 at the proper rate. And a similar connection may be provided between the drive shaft of the intermediate pressure belt 44 and the remaining belt 42 to drive that belt 42.

Figures 8, 16:
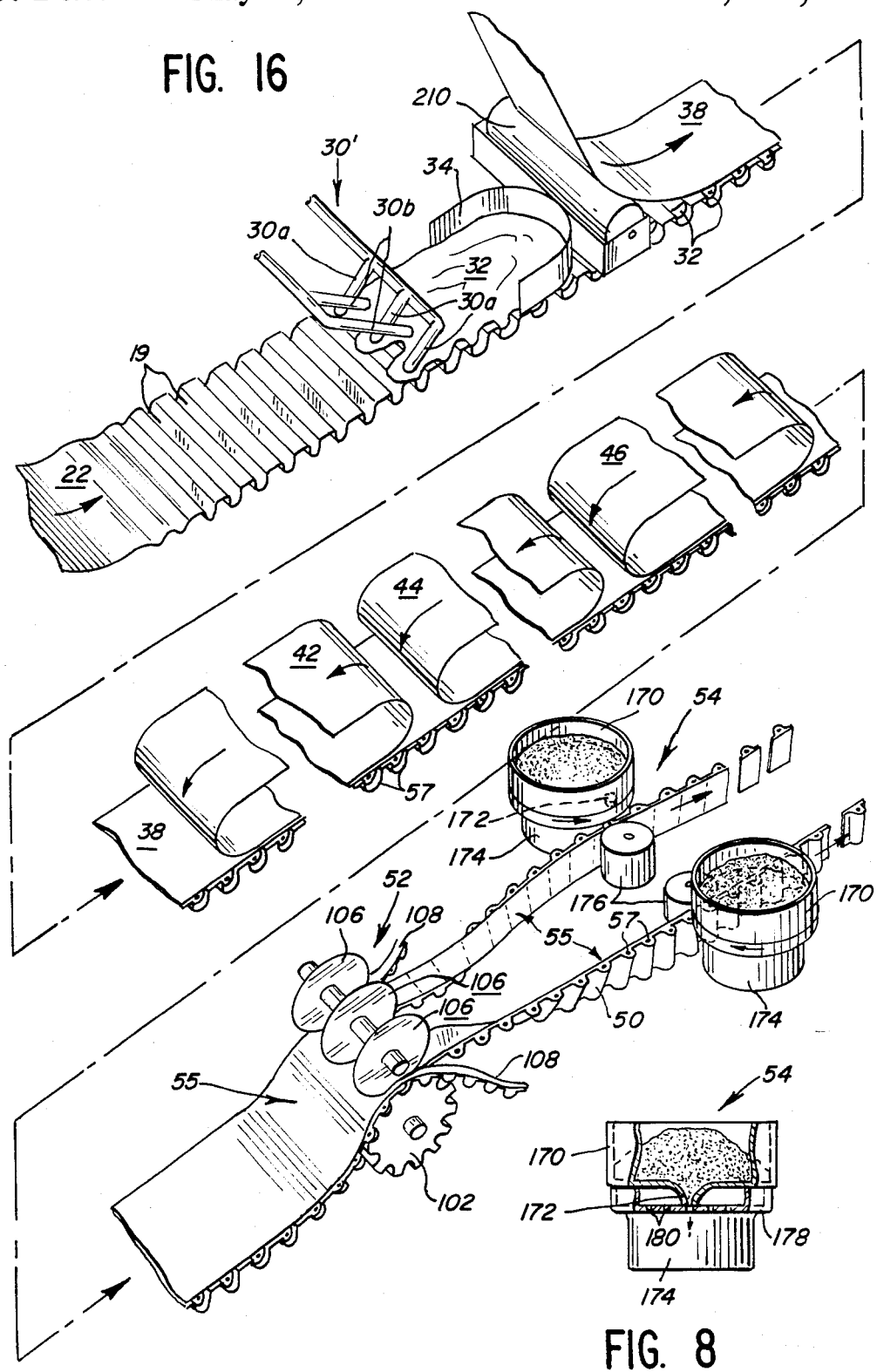
FIG. 8 is a cross-sectional view of a seeder which may be used with the present invention.
FIG. 16 is a slightly modified simplified perspective view of the overall operation of the soil plug forming machine.

In the preferred embodiment where seeds are germinated in the soil plugs 50, two seeders 54 add seeds to the depressions 57 on both of the soil plug chains 55 after the cured chain 55 has been cut in half as previously described. A suitable seeder 54 for accomplishing this function is shown in FIGS. 1, 8 and 16. The seeder includes a stationary seed bin 170 in which the desired type of seeds may be stored. The seed bin 170 includes a funnel portion 172 positioned above the seed plug chain 55 as it is pulled therebeneath by a suitable set of rollers 174, 176. The funnel portion 172 is sized so that at its lowest end, it is large enough for only one seed. Thus, the funnel portion 172 may be varied in size depending upon the type of seeds used.

An indexing plate 178 having a plurality of openings 180 is positioned beneath the funnel portion 172. The plate 178 indexes with the soil plugs 50 so that an opening 180 is beneath the funnel portion 172 when a soil plug 50 is positioned therebeneath, thereby allowing a seed to drop from the funnel portion 172 through the opening 180 and into the depression 57 in the soil plug 50.

Rather than using the soil plugs 50 for direct seeding, the depressions 57 may be filled with appropriate solidifying Phase III media 190 for tissue culture use as shown in FIGS. 9 and 10. The Phase III media 190 is composed of water nutrients, growth regulators, and agar or some other gelling agent. This is desirable when using the soil plug 50 for tissue cultures since the explant 192 placed on the soil plug 50 has a small cross-section and must contact a liquid nutrient film for initial growth. Since agar will solidify in the depression 57 with less than 0.5% dry matter, a liquid nutrient film between the cut explant 192 and the media 190 is maintained. In order to form such a seal plug 50 for tissue culture use, heated liquid agar may be added to the depression 57 in the end of the soil plug 50. When cooled, the media 190 will solidify and the explant 192 may then be placed upon it (FIG. 9) where it will begin to form roots. If difficulties are encountered relating to excessive flowing of the hot liquid Phase III media 190 into the interstices of the soil plug, it has been found useful to chill the soil plugs 50 prior to filling.

The explant roots 194 will eventually grow out of the media 190 and into the remainder of the soil plug 50 (see FIG. 10). It is desirable that the roots 194 grow into the soil plug 50 since the gelled media 190 is friable and is not highly permeable to the gases necessary for normal root development. Once the explant 192 has become rooted in the soil plug 50, it may be transplanted with minimum loss.

With some transplants, such as forest trees, the use of field grown rather than greenhouse grown seedlings is advantageous owing primarily to the less attractive nature of the less succulent field grown seedlings to browsing wildlife. In such circumstances, the modified mold element 14a shown in FIG. 11 may be used. The modified mold element 14a has the same body portion 70 with a cavity 19 as previously described. However, each die element 74a includes a slot 160 into which a rooted plant or cutting 162 may be placed. The plant or cutting 162 may be placed in the slot 160 manually or in any other suitable manner. With this alternative embodiment, the plant 162 would be added after the paper sheet 22 is corrugated into the mold elements 14a but before the mixture 32 is added, the mixture 32 being added and cured with the plants 162 in the mold element 14a. The plants 162 are added to each side so that, as with the first described embodiment, the soil plugs may be cut in half to produce after cutting two continuous chains 55 of soil plugs 50 and trees or cuttings.

Soil plugs may also be formed without either a seed depression or the cuttings and then cut longitudinally so that cuttings may be inserted after the soil plug is molded. Alternatively, soil plugs may also be molded with a larger cavity in the end to accept rooted or non-rooted cuttings after molding.

The advantage of stabilized soil encasement of rooted field grown seedlings 162 is the same as with seed transplant in terms of the protection of the hair roots from desiccation and mechanical injury during transplanting and the high water and nutrient retention of the stabilized medium. The soil plug in such cases is formed around pregrown roots 163 and the encased cuttings 162 may then be held under protective conditions during root system regeneration in the soil plug.

The opportunity to screen the unsuccessful tree transplants during a three to six week establishment period before transplanting in the field is important. Also, the use of soil plugs in this manner virtually assures that there will be no "J" roots among the field transplanted trees, another highly important advantage. "J" rooting or the curving upward of the root apex at the time of transplanting generally results in a 25% to 40% loss in timber yield from that tree at the time of harvest 25 to 40 years later, and it may further contribute substantially to wind damage during its multi-year growth period.

With the preferred embodiment, spacing between successive soil plugs 50 in the chain 55 is approximately equal to or greater than the width of a plug 50. This enables two chains 55 to be mated together as shown in FIG. 12, yielding a single, continuous row of plugs with a spacing between plug centers approximately equal to the diameter of the soil plugs 50.

Other shapes may also be employed. For example, as illustrated in FIGS. 13 and 14, the mold elements 14b may have V-grooves 19' so as to form the soil plugs 50' with a triangular cross-section. Two chains 55' of triangular soil plugs 50' could be mated as shown in FIG. 14 without requiring any spacing between the individual plugs 50' on each chain 55', thereby minimizing paper use. It is noteworthy that triangular soil plugs 50' using an equal volume of mixture will result in the use of only about half as much paper 22, 38 for encasement as that used in the casing the quasicylindrical soil plugs 50. Also, center-to-center spacing of the interlocked equal volume triangular soil plugs 50' is decreased by about 12% as compared to corresponding interlocked quasicylindrical soil plugs 50.

Still other shapes may be used and are apparent, the only constraint being that one side of the mold be essentially flat and that the solidified soil plugs 50 be capable of being removed from the top of the mold elements 14.

Still another soil plug formation is shown in FIG. 15. The soil plug 50" in its two end portions 200 and the middle portion 202 are formed from a mixture having a normal prepolymer concentration while the remaining two portions 204 are formed from a mixture having one half or less the normal concentration of prepolymer. Also, the insides of both sheets of paper 22, 38 are coated with a thin layer of prepolymer. When the soil plug 50" is split in half and turned upright, the portions 204 formed by the low prepolymer concentration are enclosed by the paper 22, 38 on the sides and by the portions 200, 204 formed by normal prepolymer concentrations on the top and bottom. Thus, this construction does not significantly reduce the strength of the individual soil plugs 50" while substantially reducing the amount of prepolymer which must be used. Inasmuch as the prepolymer is a major cost, a substantial cost savings would be received. The machine 10 heretofore described may easily be modified to form such soil plugs 50", and those modifications are described further below with respect to FIG. 16.

INDUSTRIAL APPLICABILITY

The overall operation of the continuous molding machine 10 is illustrated by FIG. 16. In order to better show the formation of the soil plugs 50, the mold elements 14 have been omitted from FIG. 16.

Beginning at the left end of the layout in FIG. 16, the first continuous sheet of paper 22 is formed in a corrugated shape.

The mixture 32 is added over the paper 22 by a modified nozzle arrangement 30' to provide a reduced cost soil plug structure as previously discussed and shown in FIG. 15. Three nozzles 30a introduce a mixture with a normal concentration of prepolymer while two nozzles 30b introduce a slurry of low prepolymer concentration. A roller 210 is also shown for applying the prepolymer to the second continuous sheet of paper 38. A spray system may be used for a similar application to the top of the first continuous sheet of paper 22 after crimping into the molds but before filling if this is desired.

The mixture 32 conforms to the corrugated shape of the paper 22 in the mold elements 14 (not shown) and passes beneath the scraper 34 which causes the top of the soil plug chain 55 to be flat. Another continuous sheet of paper 38 is then added to the top of the soil plug chain 55, giving the chain its final form.

Thereafter, the entire chain with paper sheets 22, 38 on both sides passes beneath a series of pressure belts 42, 44, 46 so that it is confined between the mold chain 12 and the pressure belts 42, 44, 46 so as to ensure adhesion of the paper 22, 38 as the mixture 32 is cured and also to ensure that the mixture 32 conforms to the shape of the mold and die elements 14, 74. The soil plug chain 55 cures while underneath the pressure belts 42, 44, 46. When it emerges from beneath the last pressure belt 46, it passes over the drive wheel 102 of the cutter 52 so that the cutting blades 106 trim the excess paper 108 from either side and cut the chain 55 of plugs 50 in half.

With the preferred embodiment using the soil plugs to germinate seeds, the seeders 54 add seeds to the depression 57 in each soil plug 50 and the chain 55 of soil plugs 50 with the seeds therein may then be rolled up and placed in an appropriate environment such as a greenhouse with the proper moisture content, where the seeds are allowed to germinate and grow into seedlings. When the seeds have grown for a sufficient period, the soil plugs 50 may then be replanted in the final location, the germinated seeds being more likely to grow fully than if the seeds had been originally planted in the field. In the alternative embodiment wherein cuttings or rooted plants 162 are placed in the uncured mixture 32, the soil plugs 50 are commonly rooted and then transplanted although they may in some applications be immediately replanted in the final location without any intermediate growing stage.

Other aspects, objects and advantages of this invention can be obtained from a study of the drawings, the disclosure and the appended claims.

I claim:

1. The product produced by the method comprising the steps of:
    conforming a first continuous sheet of cover material (22) to a series of mold elements (14), said material (22) being corrugated when conformed to said mold elements (14);
    adding a reaction mixture (32) of soil slurry and polymerizing agent over said first material (22), said slurry being composed of water and suspended solid particulate material and said mixture being curable to form an open-celled elastomeric hydrophilic rooting medium;
    adding a second continuous sheet of cover material (38) to the top of said mixture (32);
    curing said mixture (32) while applying pressure to said second cover material (38) to conform said mixture (32) within said mold elements (14), said cured mixture forming an open-celled elastomeric hydrophilic rooting medium; and
    cutting said product longitudinally to form two separate chains of soil plugs.

2. The product of claim 1, wherein said mold elements (14) during curing are arranged in a substantially horizontal plane.

3. The product of claim 1, wherein said mold elements (14) form depressions (57) at both ends and the method for producing said product further comprising the step of implanting seeds within the depressions (57) of the soil plugs (50) of both chains (55).

4. A soil plug (50) comprising a longitudinal portion (50) of cured polyurethane foam, said longitudinal portion (50) being substantially encased on its longitudinal sides by paper (22,38).

5. A method for producing a plurality of interconnected soil plugs (50) in which plants may be grown prior to permanent planting, the steps comprising:
    conforming a first continuous sheet of cover material (22) to a series of mold elements (14), said material (22) being corrugated when conformed to said mold elements (14);

adding a reaction mixture (32) of soil slurry and polymerizing agent over said first material (22), said slurry being composed of water and suspended solid particulate material and said mixture being curable to form an open-celled elastomeric hydrophilic rooting medium;

adding a second continuous sheet of cover material (38) to the top of said mixture (32);

curing said mixture (32) while applying pressure to said second cover material (38) to conform said mixture (32) within said mold elements (14) thereby forming a cured chain (55) of soil plugs (50), said cured mixture forming an open-celled elastomeric hydrophilic rooting medium; and cutting said cured chain of soil plugs (50) longitudinally to form two separate chains (55) of soil plugs.

6. The method of claim 5, wherein said mold elements (14) form depressions (57) at both ends and further comprising the step of implanting seeds within the depressions (57) of the soil plugs of both chains.

7. The method of claim 5, further comprising, prior to the addition of the mixture (32) into the mold elements (14), adding a cutting or rooted plant (160) to both ends of said mold elements (14).

8. The method of claim 5, further comprising the step of folding die elements (74) over the sides of the first sheet of cover material (22) to maintain said first sheet in conformity with said mold elements (14) during the mixture adding, second sheet adding, and mixture curing steps.

9. The method of claim 8, wherein the die elements (74) include nipple portions (80) which form seed receiving depressions (57) at both ends of each mold element (14).

* * * * *